(12) United States Patent
Draznin

(10) Patent No.: US 8,665,707 B2
(45) Date of Patent: Mar. 4, 2014

(54) OPTIMIZING USE OF MOBILE GATEWAYS

(75) Inventor: Sagiv Draznin, Walnut Creek, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 69 days.

(21) Appl. No.: 13/308,292

(22) Filed: Nov. 30, 2011

(65) Prior Publication Data

US 2013/0135990 A1 May 30, 2013

(51) Int. Cl.
*H04L 12/26* (2006.01)

(52) U.S. Cl.
USPC ............ 370/221; 370/401; 709/203; 709/219

(58) Field of Classification Search
USPC .......... 370/221, 331, 395, 400, 401; 709/223, 709/227, 203, 219
See application file for complete search history.

(56) References Cited

U.S. PATENT DOCUMENTS

| 6,034,961 | A | * | 3/2000 | Masuo et al. | 370/219 |
| 2007/0070959 | A1 | * | 3/2007 | Almeroth et al. | 370/338 |
| 2010/0281151 | A1 | * | 11/2010 | Ramankutty et al. | 709/223 |
| 2012/0170548 | A1 | * | 7/2012 | Rajagopalan et al. | 370/331 |

* cited by examiner

*Primary Examiner* — Andrew Lai
*Assistant Examiner* — Sumitra Ganguly

(57) ABSTRACT

A device receives first information from a first service gateway (SGW) and second information from a second SGW. The device further generates a rank of the first SGW and the second SGW based on the first information and the second information. The device also receives a request for a session from a user device, selects the first SGW or the second SGW based on the rank, and uses the selected SGW for the session.

18 Claims, 11 Drawing Sheets

US 8,665,707 B2

OPTIMIZING USE OF MOBILE GATEWAYS

BACKGROUND

Wireless communication services, such as voice over Internet Protocol (VoIP), continue to increase in popularity, leading to increasing numbers of users requesting these services. Mobile phone devices access the services via a cellular network. A mobile device connects to the wireless cellular network via a particular base station, such as an evolved Node B (eNB), when the mobile phone device is within a geographic area associated with the particular base station. The particular base station may be associated with a particular active mobile gateway, such as a serving gateway (SGW), of the cellular network. The particular active mobile gateway may serve the mobile device by establishing a session for the mobile device to access one of the services. The particular active mobile gateway can fail during the session (e.g., due to being overloaded), and the session may be lost. When the mobile device determines that the particular active mobile gateway failed, the mobile device needs to reestablish a connection to access one of the services by using a particular standby mobile gateway, associated with the particular base station, instead of the particular active mobile gateway. As a result, the user's experience may suffer due to the interruption caused by the failure of the particular active mobile gateway, and by having to wait an extended period of time, such as over 30 seconds, until the connection is reestablished by the mobile device.

DETAILED DESCRIPTION OF PREFERRED EMBODIMENTS

The following detailed description refers to the accompanying drawings. The same reference numbers in different drawings may identify the same or similar elements.

Systems and/or methods described herein may select a mobile gateway, such as a serving gateway (SGW) or a packet data network (PDN) gateway (PGW), for a session. For example, an intermediary system may determine loads of two or more SGWs. The intermediary gateway may select a SGW with a load that is lower than a load of any other one of the SGWs. The intermediary system may use the selected SGW to create a session between a mobile device and a network, via which a service is provided to the mobile device. As a result, the SGWs are dynamically assigned to service particular mobile devices based on the loads of the SGWs, and the total load is distributed between the SGWs. A likelihood of a failure of any one of the SGWs is decreased because a particular SGW is less likely to become overloaded.

Figure 1:
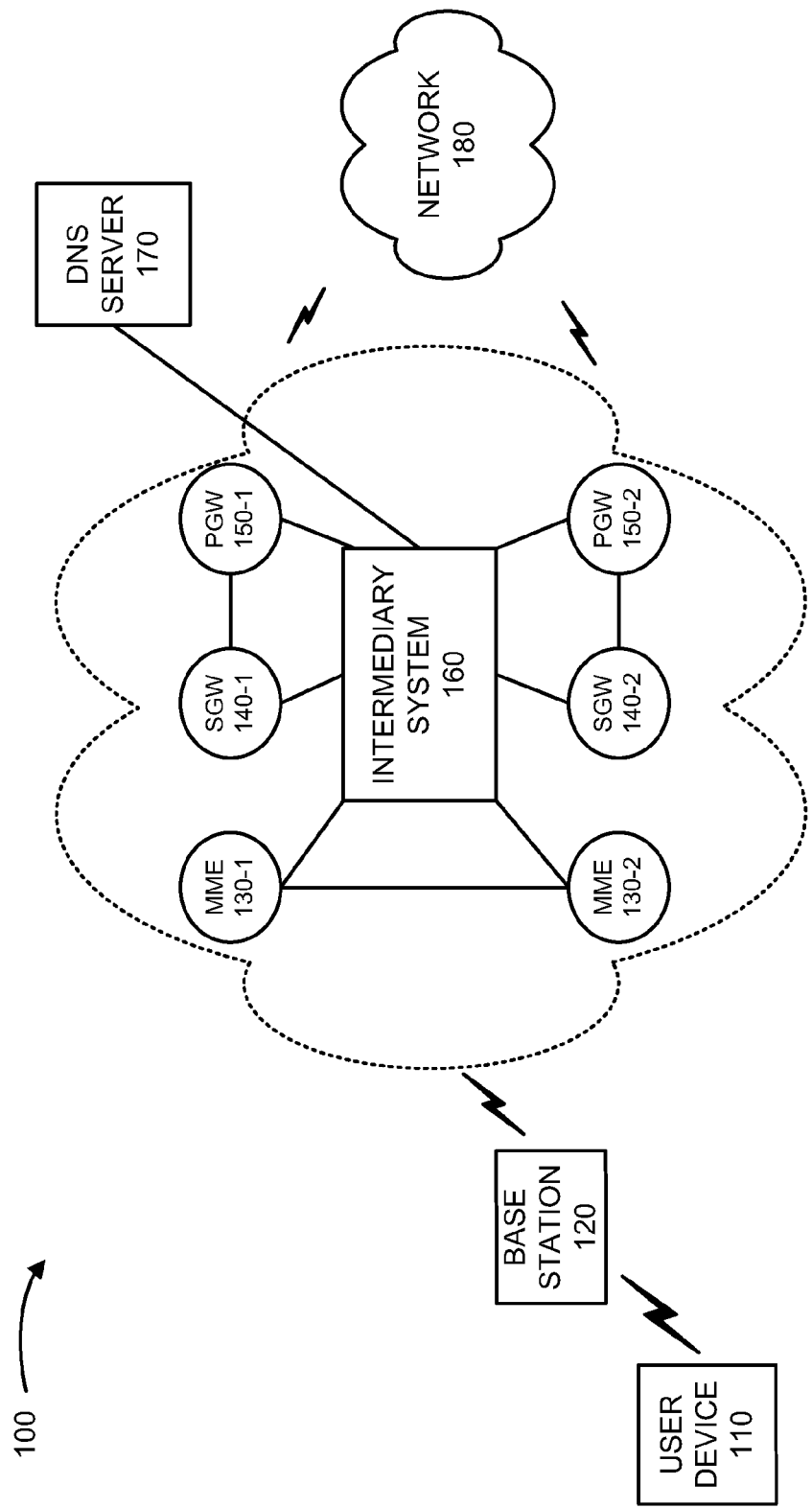
FIG. 1 is a diagram of an example environment in which systems and/or methods described herein may be implemented.

FIG. 1 is a diagram of an example environment 100 in which systems and/or methods described herein may be implemented. As shown in FIG. 1, environment 100 may include a user device 110, a base station 120, mobility management entity (MME) devices 130, SGW devices 140, PGW devices 150, intermediary system 160, a domain name server (DNS) 170, and a network 180. Devices and/or networks of environment 100 may interconnect via wired and/or wireless connections. One user device 110, one base station 120, two MME devices 130, two SGW devices 140, two PGW devices 150, one intermediary system 160, one DNS 170, and one network 180 have been illustrated in FIG. 1 for simplicity. In practice, there may be more user devices 110, base stations 120, MME devices 130, SGW devices 140, PGW devices 150, intermediary systems 160, DNSs 170, and/or networks 180.

In one implementation, environment 100 may include an evolved packet system (EPS) that includes a long term evolution (LTE) network and/or an evolved packet core (EPC) that operate based on a third generation partnership project (3GPP) wireless communication standard. The LTE may be a radio access network (RAN) that includes one or more base stations 120 that take the form of evolved Node Bs (eNBs) via which user device 110 communicates with the EPC. The EPC may include MME devices 130, SGW devices 140, and/or PGW devices 150 that enable user device 110 to communicate with network 180.

User device 110 may include any device that is capable of communicating with base station 120. For example, user device 110 may include a mobile communication device, such as a radiotelephone, a personal communications system (PCS) terminal that may, for example, combine a cellular radiotelephone with data processing and data communications capabilities; a personal digital assistant (PDA) that can include, for example, a radiotelephone, a pager, Internet/intranet access, etc.; a wireless device; a smart phone; a laptop computer with a wireless air card; a global positioning system (GPS) device; a content recording device (e.g., a camera, a video camera, etc.); a voice over Internet protocol (VoIP) device; an analog terminal adaptor (ATA); etc. Alternatively, or additionally, user device 110 may include a fixed (e.g., provided in a particular location, such as within a user's home) computation and/or communication device, such as a laptop computer, a personal computer, a tablet computer, a set-top box (STB), a television, a gaming system, etc.

Base station 120 may include one or more communication devices that receive traffic (e.g., voice and/or data) from SGW devices 140 and wirelessly transmit that traffic to user device 110. Base station 120 may also include one or more devices that wirelessly receive traffic from user device 110 and transmit that traffic to SGW devices 140 or to other user devices 110. Base station 120 may combine the functionalities of a base station and/or a radio network controller (RNC) in second generation (2G) or third generation (3G) radio access networks. In one example implementation, base station 120 may be an eNB associated with the LTE network that receives traffic from and/or sends traffic to network 130 via MME devices 130, SGW devices 140, and/or PGW devices 150. Base station 120 may send traffic to and/or receive traffic from user device 110 via an air interface.

MME device 130 may include one or more devices that gather, process, search, store, and/or provide information in a manner described herein. In one implementation, MME device 130 may include control plane processing for the EPC of environment 100. For example, MME device 130 may implement tracking and paging procedures for user device 110, may activate and deactivate bearers for user device 110, may authenticate a user of user device 110, and may interface to non-LTE radio access networks. A particular MME device 130 may interface with other MME devices 130 in the EPC of environment 100, and may send and receive information associated with user devices 110 to the other MME devices 130. The information associated with user devices 110 may allow one MME device 130 to take over control plane processing of user devices 110 serviced by another MME device 130, if the other MME device becomes unavailable. In another implementation, MME device 130 may perform operations associated with handing off user device 110 between base stations 120. In yet another implementation, MME device 130 may select, or request for intermediary system 160 to select, to use a particular SGW device 140 and/or a particular PGW device 150 to create a session for a particular user device 110.

SGW device 140 may include one or more devices that gather, process, search, store, and/or provide information in a manner described herein. In one implementation, SGW device 140 may, for example, aggregate traffic received from one or more base stations 120, and may send the aggregated traffic to network 180 (e.g., via PGW device 150) and/or other devices associated with the EPC. SGW device 140 may also receive traffic from the other network devices and/or may send the received traffic to user device 110 via base station 120.

PGW device 150 may include one or more devices that gather, process, search, store, and/or provide information in a manner described herein. In one example implementation, PGW device 150 may include a device that aggregates traffic received from one or more SGW devices 140, and may send the aggregated traffic to network 180. In another example implementation, PGW device 150 may receive traffic from network 180, and may send the traffic toward user device 110 via SGW device 140, intermediary system 160, MME device 130, and/or base station 120.

Intermediary system 160 may include one or more devices that gather, process, search, store, and/or provide information in a manner described herein. In one example implementation, intermediary system 160 may retrieve load information from SGW devices 140 and PGW devices 150. Intermediary system 160 may select a particular SGW device 140 and/or a particular PGW device 150 based on the retrieved load information. Intermediary system 160 may use the particular SGW device 140 and/or the particular PGW device 150 to create a session for user device 110. In another example implementation, intermediary system 160 may generate one or more rankings based on the retrieved load information. Intermediary system 160 may provide the one or more rankings to DNS 170.

DNS 170 may include one or more server devices, or other types of devices, that gather, process, search, and/or provide information in a manner described herein. In one example implementation, DNS 170 may include a hierarchical naming system for computers, services, and/or any resource participating in a network, such as network 180. DNS 170 may associate various information with domain names assigned to each participant, and may translate domain names meaningful to humans into numerical (e.g., binary) identifiers associated with network devices for purposes of locating and addressing these devices. Additionally, or alternatively, DNS 170 may store information associated with mobile gateways, such as SGW devices 140 and/or PGW devices 150. The information associated with mobile gateways may include one or more rankings that indicate a particular SGW device 140 and/or a particular PGW device 150 that should be used to establish a session for user device 110 to access a service provided via network 180.

Network 180 may include one or more wired and/or wireless networks. For example, network 180 may include a cellular network, a public land mobile network (PLMN), a second generation (2G) network, a third generation (3G) network, a fourth generation (4G) network, a fifth generation (5G) network, and/or another network. Additionally, or alternatively, network 180 may include a wide area network (WAN), a metropolitan network (MAN), an ad hoc network, an intranet, the Internet, a fiber optic-based network (e.g., a FiOS network), and/or a combination of these or other types of networks. Additionally, or alternatively, network 180 may include, or connect to, an external IP network. The external IP network may include, for example, an IP Multimedia Subsystem (IMS) network, which may provide voice and multimedia services to user device 110, based on Session Initiation Protocol (SIP).

Although FIG. 1 shows example devices/networks of environment 100, in other implementations, environment 100 may include fewer devices/networks, different devices/networks, differently arranged devices/networks, or additional devices/networks than depicted in FIG. 1. Alternatively, or additionally, one or more devices/networks of environment 100 may perform one or more tasks described as being performed by one or more other devices/networks of environment 100.

Figure 2:
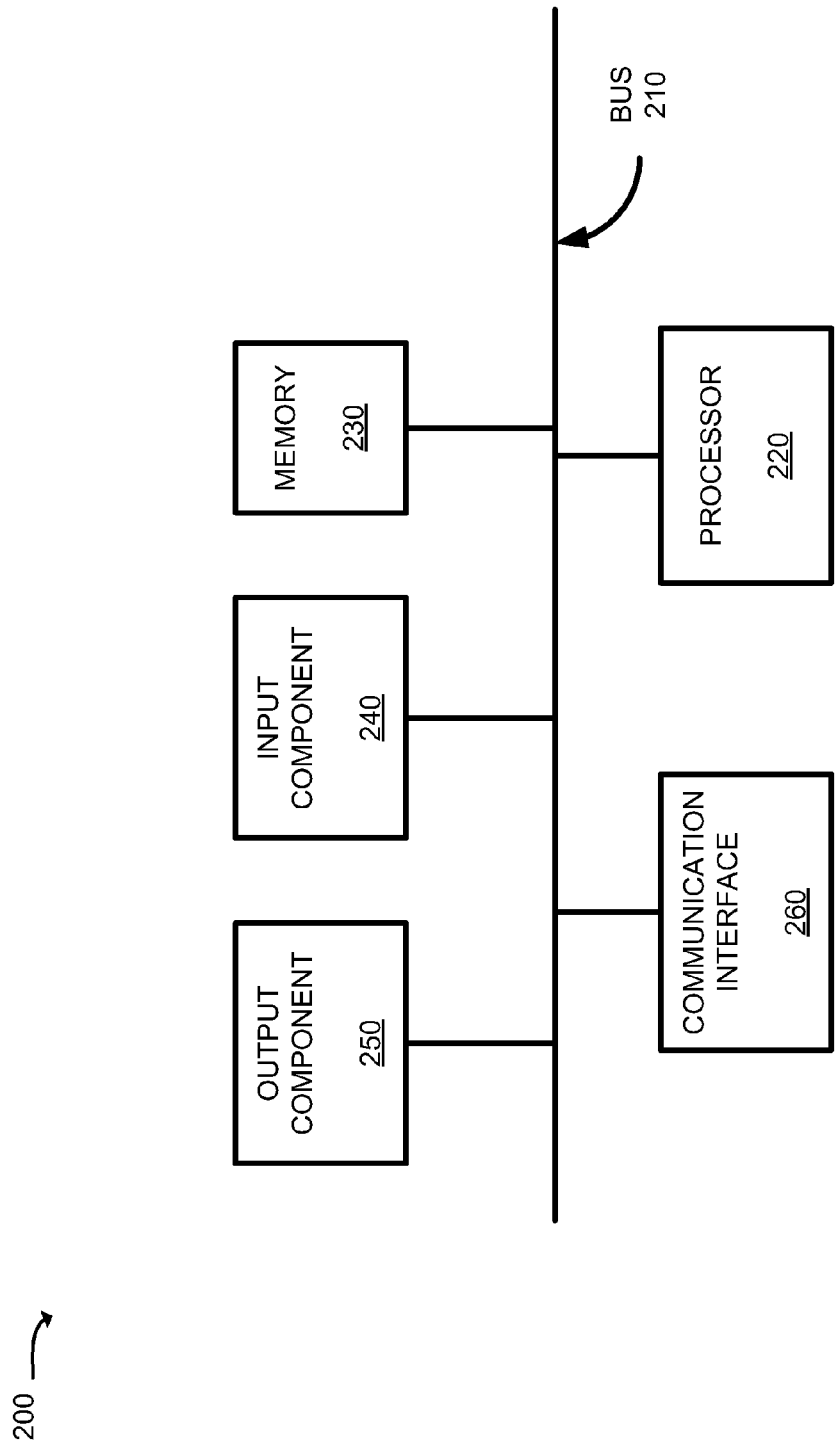
FIG. 2 is a diagram of example components of a device that may correspond to one of the devices of the environment depicted in FIG. 1.

FIG. 2 is a diagram of example components of a device 200. Device 200 may correspond to user device 110, MME device 130, SGW device 140, PGW device 150, intermediary system 160, and/or DNS 170. Alternatively, or additionally, each of user device 110, MME device 130, SGW device 140, PGW device 150, intermediary system 160, and/or DNS 170 may include one or more devices 200 and/or one or more portions of user device 200.

As shown in FIG. 2, device 200 may include a bus 210, a processor 220, a memory 230, an input component 240, an output component 250, and a communication interface 260. In other implementations, device 200 may contain fewer components, additional components, different components, or differently arranged components than depicted in FIG. 2. Additionally, or alternatively, one or more components of device 200 may perform one or more tasks described as being performed by one or more other components of device 200.

Bus 210 may include a path that permits communication among the components of device 200. Processor 220 may include a processor, microprocessor, or processing logic that may interpret and execute instructions. Memory 230 may include any type of dynamic storage device that may store information and instructions, for execution by processor 220, and/or any type of non-volatile storage device that may store information for use by processor 220.

Input component 240 may include a mechanism that permits a user to input information to device 200, such as a keyboard, a keypad, a button, a switch, etc. Output component 250 may include a mechanism that outputs information to the user, such as a display, a speaker, one or more light emitting diodes (LEDs), etc.

Communication interface 260 may include any transceiver-like mechanism that enables device 200 to communicate with other devices and/or systems. For example, communication interface 260 may include an Ethernet interface, an optical interface, a coaxial interface, a wireless interface, or the like.

In another implementation, communication interface 260 may include, for example, a transmitter that may convert baseband signals from processor 220 to radio frequency (RF) signals and/or a receiver that may convert RF signals to baseband signals. Alternatively, communication interface 260 may include a transceiver to perform functions of both a transmitter and a receiver of wireless communications (e.g., radio frequency, infrared, visual optics, etc.), wired communications (e.g., conductive wire, twisted pair cable, coaxial cable, transmission line, fiber optic cable, waveguide, etc.), or a combination of wireless and wired communications. Communication interface 260 may connect to an antenna assembly (not shown in FIG. 2) for transmission and/or reception of the RF signals.

The antenna assembly may include one or more antennas to transmit and/or receive RF signals over the air. The antenna assembly may, for example, receive RF signals from communication interface 260 and transmit them over the air, and receive RF signals over the air and provide them to communication interface 260. In one implementation, for example, communication interface 260 may communicate with network 120 and/or devices connected to network 120.

As will be described in detail below, device 200 may perform certain operations. Device 200 may perform these operations in response to processor 220 executing software instructions (e.g., computer program(s)) contained in a computer-readable medium, such as memory 230, a secondary storage device (e.g., hard disk, CD-ROM, etc.), or other forms of RAM or ROM. A computer-readable medium may be defined as a non-transitory memory device. A memory device may include space within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of or in combination with software instructions to implement processes described herein. Thus, implementations described herein are not limited to any specific combination of hardware circuitry and software.

Figure 3A:
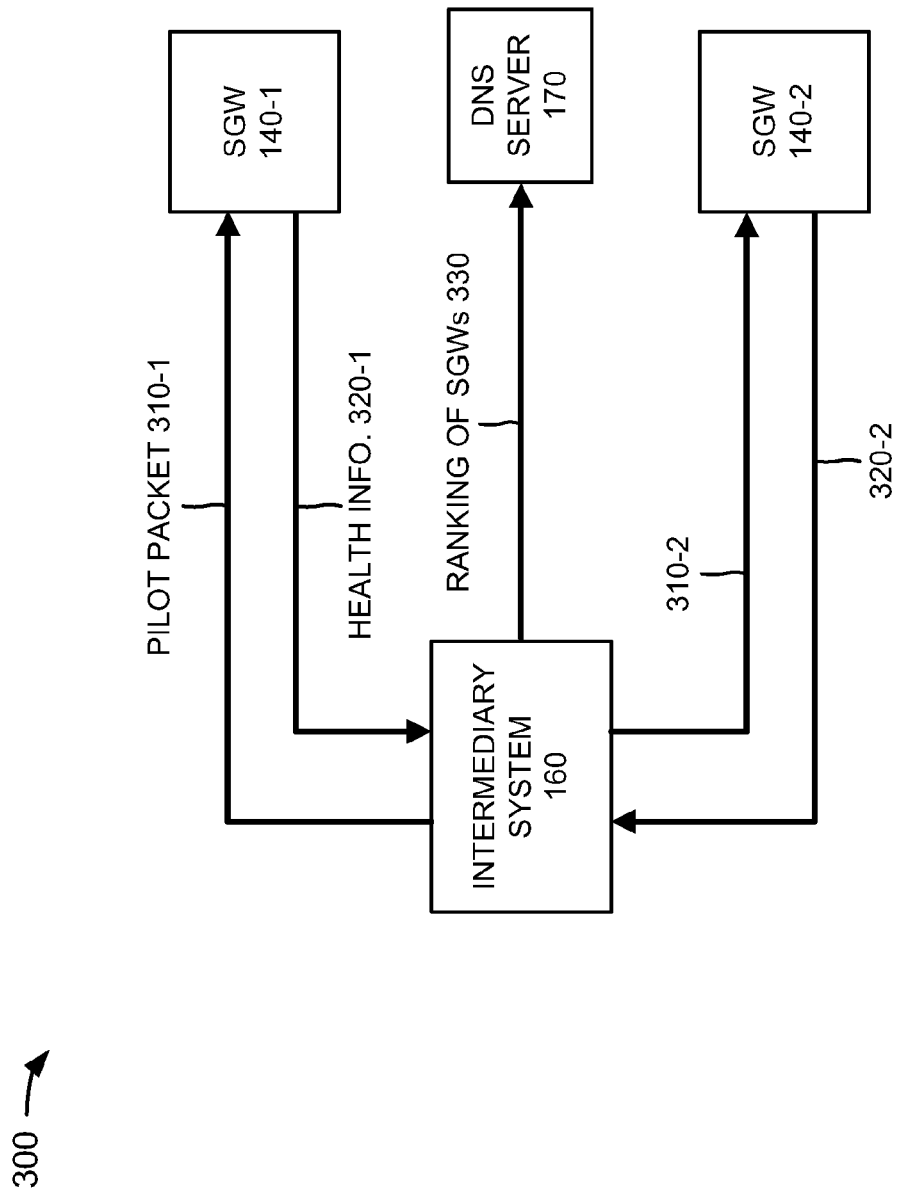
FIGS. 3A-3D are diagrams of example operations capable of being performed, to establish a session, by example portions of the environment in FIG. 1.

FIGS. 3A-3D are diagrams of example operations capable of being performed, to establish a session, by example portions of environment 100. As shown in FIG. 3A, a portion 300, of environment 100, may include SGW device 140-1, SGW device 140-2, intermediary system 160, and DNS 170. SGW device 140-1, SGW device 140-2, intermediary system 160, and DNS 170 may include the features described above in connection with, for example, FIGS. 1 and 2.

As further shown in FIG. 3A, intermediary system 160 may probe SGW devices 140 by providing, periodically (e.g., every 10 minutes), a pilot packet 310-1 to SGW device 140-1 and a pilot packet 310-2 to SGW device 140-2. In one implementation, pilot packet 310-1 may request that SGW device 140-1 provide one or more types of information associated with SGW device 140-1. The types of information may include types of information included in health information 320-1, described further below. In another implementation, pilot packet 310-1 may include a keepalive message.

In response to pilot packet 310-1, SGW device 140-1 may generate health information 320-1, and may provide health information 320-1 to intermediary system 160. Health information 320-1 may include, for example, load information, information that indicates whether SGW device 140-1 is active (e.g., alive), a relevant temperature associated with SGW device 140-1, and/or any other information that can be used to determine whether SGW device 140-1 is more or less likely to fail than other SGW devices 140. The load information may include information associated with the load (e.g., based on percent utilization, bandwidth utilization, etc.) of SGW device 140-1. In one example, the load information may include a percentage based on a ratio of a quantity of user devices 110 being serviced by SGW device 140-1 and a maximum quantity of user devices 110 that can be serviced by SGW device 140-1. In another example, the load information may include the ratio, the quantity of user devices 110 being serviced by SGW device 140-1, and/or the maximum quantity of user devices 110 that can be serviced by SGW device 140-1.

In response to pilot packet 310-2, SGW device 140-2 may generate health information 320-2, and may provide health information 320-2 to intermediary system 160. Health information 320-2 may include information associated with SGW device 140-2, and may include the same type of information as included in health information 320-1.

Intermediary system 160 may determine a first rating for SGW device 140-1 based on health information 320-1, and may determine a second rating for SGW device 140-2 based on health information 320-2. For example, intermediary system 160 may determine a first value for the first rating when health information 320-1 indicates that SGW device 140-1 has a relatively low load (e.g., 10 percent utilization), is alive, and has a relatively low temperature. Intermediary system 160 determine a second value for the second rating when health information 320-2 indicates that SGW device 140-2 has a relatively high load (e.g., 80 percent utilization), is not alive, or has a relatively high temperature. The first value may be lower than the second value, which indicates that SGW device 140-2 is more likely to fail before SGW device 140-1 fails.

Intermediary system 160 may generate a ranking 330 of SGW devices 140 based on the first rating for SGW device 140-1 and the second rating for SGW device 140-2. Further to the example above, ranking 330 may indicate that SGW device 140-1 is ranked higher than SGW device 140-2 because the first rating is lower than the second rating. As shown in FIG. 3A, intermediary system 160 may transmit ranking 330 to DNS 170. DNS 170 may store ranking 330 in a DNS file and/or may update an existing DNS file based on ranking 330.

Figure 3B:
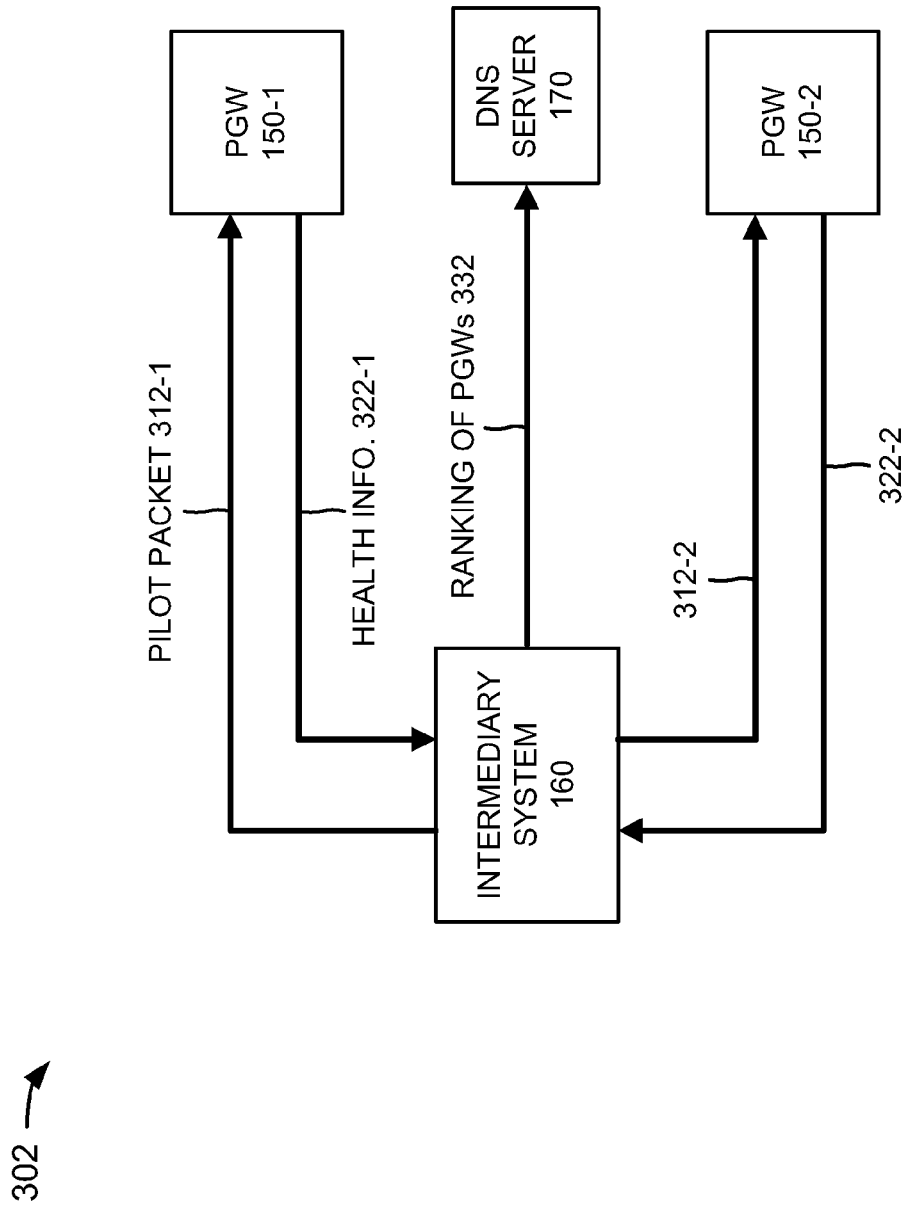

As shown in FIG. 3B, a portion 302, of environment 100, may include PGW device 150-1, PGW device 150-2, intermediary system 160, and DNS 170. PGW device 150-1, PGW device 150-2, intermediary system 160, and DNS 170 may include the features described above in connection with, for example, FIGS. 1 and 2.

As further shown in FIG. 3B, intermediary system 160 may probe PGW devices 150 by providing, periodically (e.g., every 10 minutes), a pilot packet 312-1 to PGW device 150-1 and a pilot packet 312-2 to PGW device 150-2. In one implementation, pilot packet 312-1 may request that PGW device 150-1 provide information associated with PGW device 150-1. In another implementation, pilot packet 312-1 may include a keepalive message.

In response to pilot packet 312-1, PGW device 150-1 may generate health information 322-1, and may provide health information 322-1 to intermediary system 160. Health information 322-1 may include, for example, load information, information that indicates whether PGW device 150-1 is active (e.g., alive), a relevant temperature associated with PGW device 150-1, and/or any other information that can be used to determine whether PGW device 150-1 is more or less likely to fail than other PGW devices 150. The load information may include information associated with the load (e.g., based on percent utilization, bandwidth utilization, etc.) of PGW device 150-1. In one example, the load information may include a percentage based on a ratio of a quantity of user devices 110 being serviced by PGW device 150-1 and a maximum quantity of user devices 110 that can be serviced by PGW device 150-1. In another example, the load information may include the ratio, the quantity of user devices 110 being serviced by PGW device 150-1, and/or the maximum quantity of user devices 110 that can be serviced by PGW device 150-1.

In response to pilot packet 312-2, PGW device 150-2 may generate health information 322-2, and may provide health information 322-2 to intermediary system 160. Health information 322-2 may include information associated with PGW device 150-2, and may include the same type of information as included in health information 322-1.

Intermediary system 160 may determine a first rating for PGW device 150-1 based on health information 322-1, and may determine a second rating for PGW device 150-2 based on health information 322-2. Intermediary system 160 may further generate a ranking 332 of PGW devices 150 based on the first rating for PGW device 150-1 and the second rating for PGW device 150-2. For example, ranking 332 may indicate that PGW device 150-1 is ranked lower than PGW device 150-2 because the first rating is higher than the second rating (e.g., because PGW device 150-1 is more loaded than PGW device 150-2). As shown in FIG. 3B, intermediary system 160 may transmit ranking 332 to DNS 170. DNS 170 may store ranking 332 in a DNS file and/or may update an existing DNS file based on ranking 332.

Figure 3C:
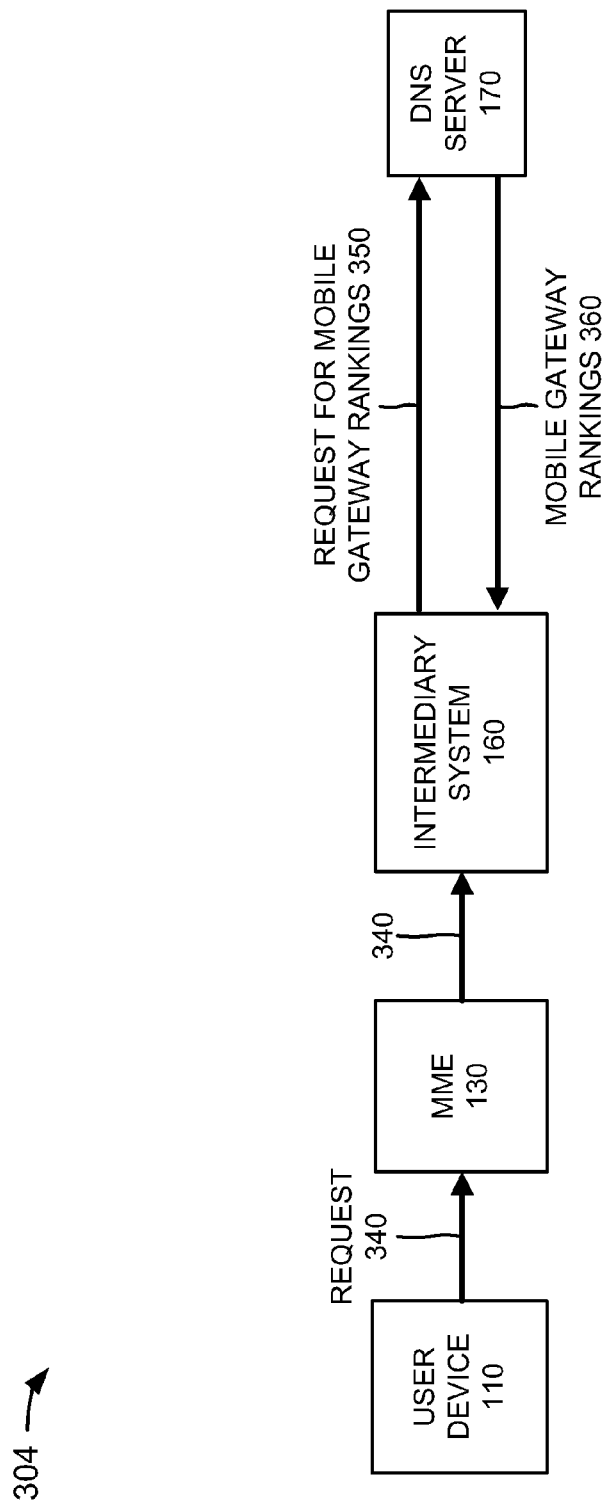

As shown in FIG. 3C, a portion 304, of environment 100, may include user device 110, MME device 130, intermediary system 160, and DNS 170. User device 110, MME device 130, intermediary system 160, and DNS 170 may include the features described above in connection with, for example, FIGS. 1 and 2.

As further shown in FIG. 3C, user device 110 may generate a request 340 for a resource that may be provided via network 180. In one example, request 340 may include a request to use a particular service, such as VoIP. In another example, request 340 may include a request for video content stored in a server of network 180. In yet another example, request 340 may include a request for a connection to network 180. User device 110 may transmit request 340 to MME device 130 via base station 120 (not shown in FIG. 3C). In one implementation, MME device 130 may receive request 340, and may forward request 340 to intermediary system 160. In another implementation, MME device 130 may perform one or more functions, described below as being performed by intermediary system 160, instead of intermediary system 160.

As show in FIG. 3C, intermediary system 160 may receive request 340 from MME 130. In response to request 340, intermediary system 160 may generate a request for mobile gateway rankings 350, and may transmit request 350 to DNS 170. DNS 170 may receive request 350, and may retrieve ranking 330 of SGW devices 140 and ranking 332 of PGW devices 150. DNS 170 may include ranking 330 of SGW devices 140 and ranking 332 of PGW devices 150 in mobile gateway rankings 360, and may transmit mobile gateway rankings 360 to intermediary system 160.

Figure 3D:
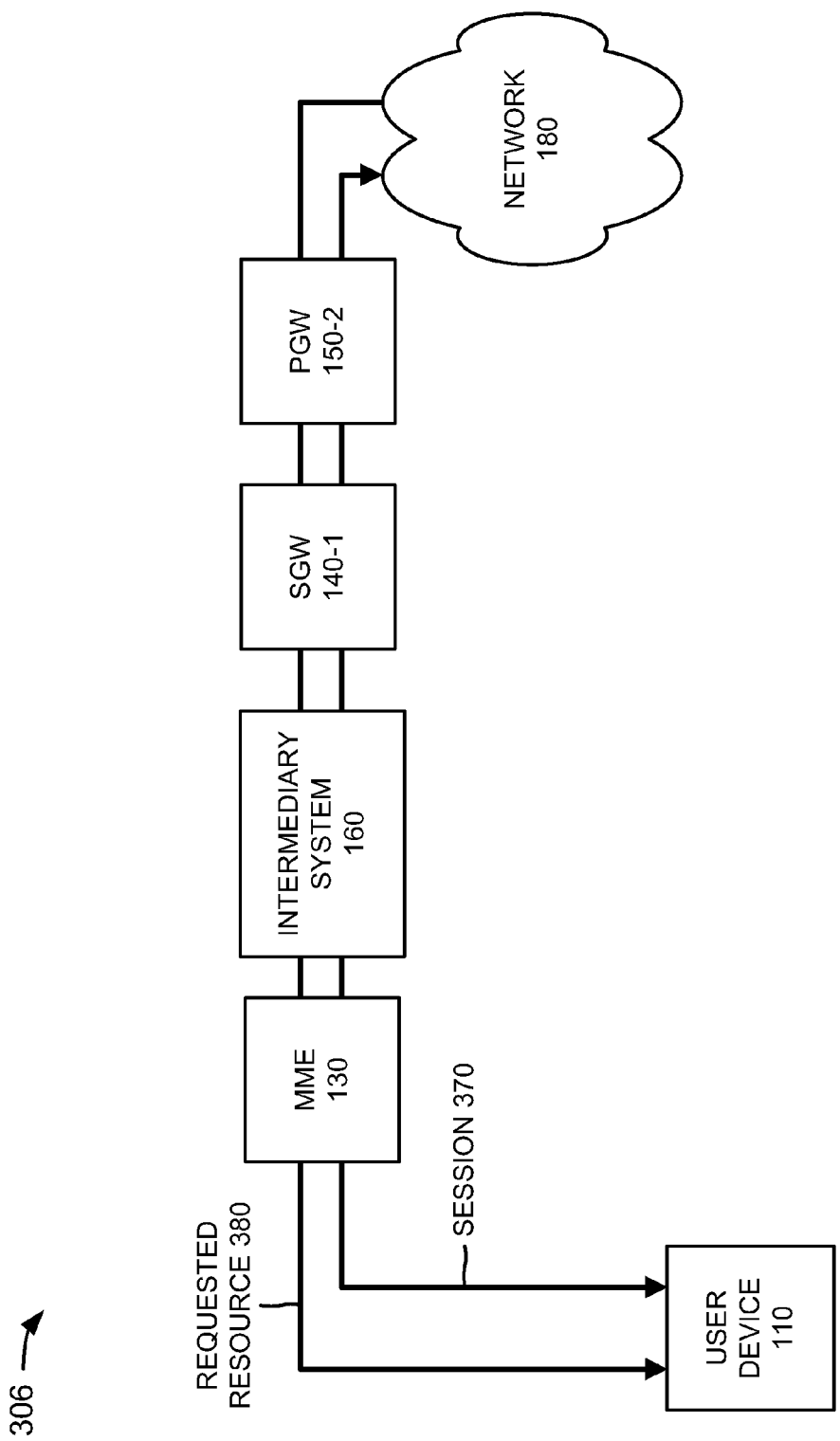

As shown in FIG. 3D, a portion 306, of environment 100, may include user device 110, MME device 130, SGW device 140-1, PGW device 150-2, and intermediary system 160. User device 110, MME device 130, SGW device 140-1, PGW device 150-2, and intermediary system 160 may include the features described above in connection with, for example, FIGS. 1 and 2.

Further to the example described above with reference to FIGS. 3A and 3B, assume that intermediary system 160 selects to use SGW device 140-1 for a session 370, shown in FIG. 3D, because SGW device 140-1 is ranked higher than any other SGW device 140 in ranking 330. Assume further that intermediary system 160 further selects PGW device 150-2 to create session 370 because PGW device 150-2 is ranked higher than any other PGW device 150 in ranking 332. Thereafter, intermediary system 360 may use SGW device 140-1 and/or PGW device 150-2 to create session 370. User device 110 may use session 370 to connect to network 180 via SGW 140-1 and PGW 150-2. After connecting to network 180 via SGW device 140-1 and PGW device 150-2, user device 110 may receive requested resource 380 from network 180 via session 370.

Although FIGS. 3A-3D show example components of portions 300-306, in other implementations, portions 300-306 may include fewer components, different components, differently arranged components, or additional components than those depicted in FIGS. 3A-3D. Additionally, or alternatively, one or more components of portions 300-306 may perform one or more tasks described as being performed by one or more other components of portions 300-306.

Figure 4A:
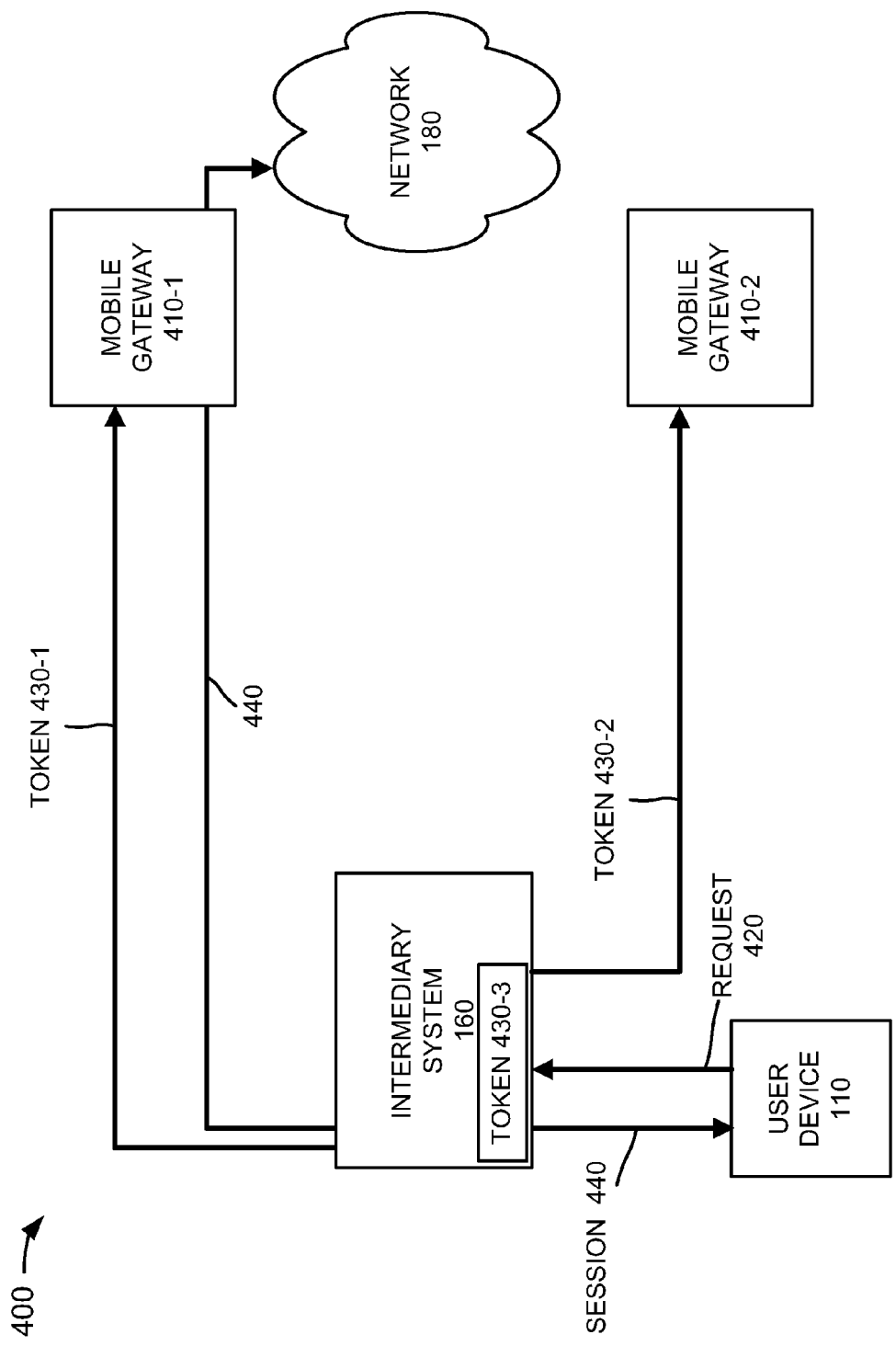
FIGS. 4A and 4B are diagrams of example operations capable of being performed, to handle a failure of a mobile gateway, by an example portion of the environment in FIG. 1.
Figure 4B:
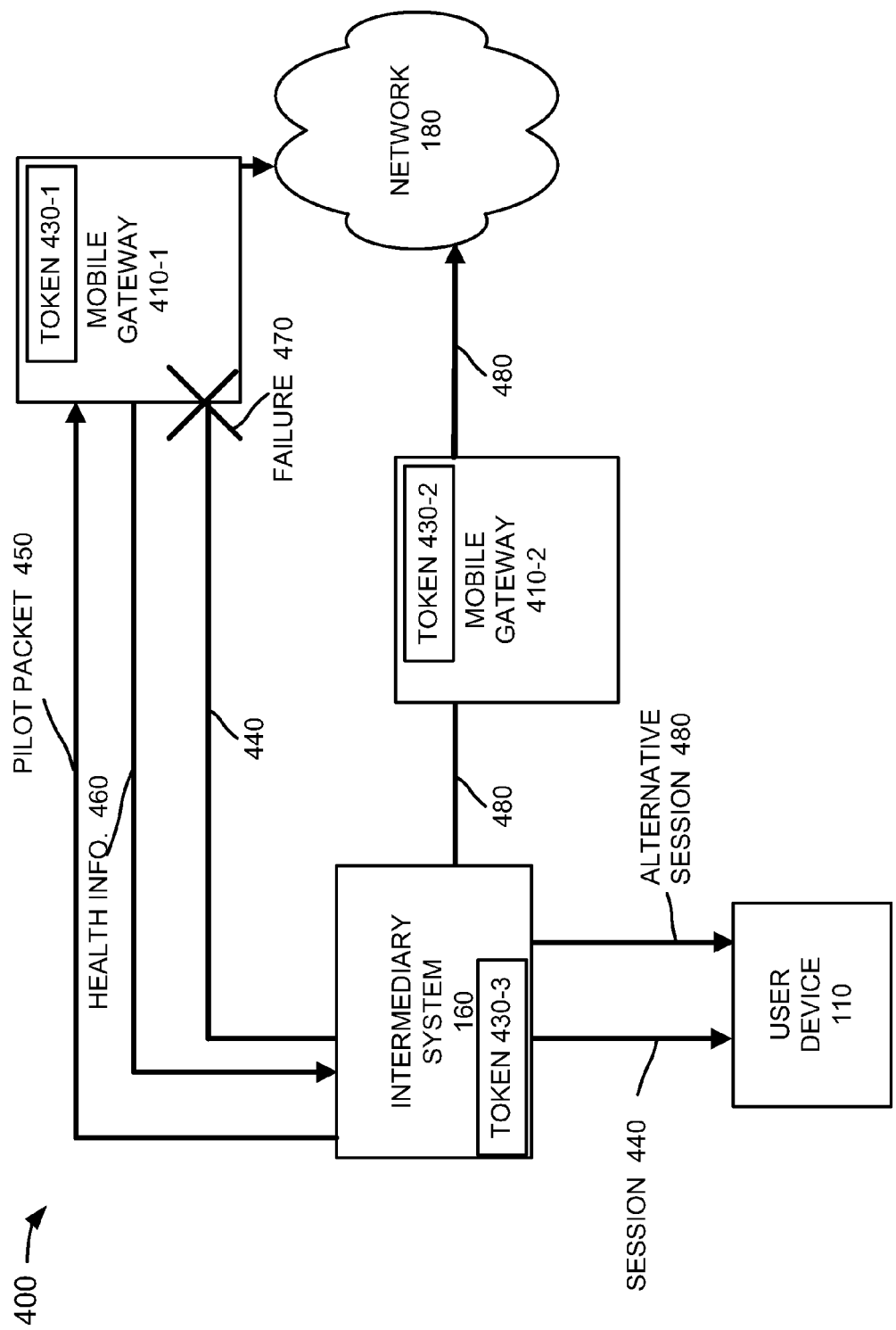

FIGS. 4A and 4B are diagrams of example operations capable of being performed by an example portion 400 of environment 100 to handle a failure of a mobile gateway. As shown in FIGS. 4A and 4B, portion 400 may include user device 110, a mobile gateway device 410-1, a mobile gateway device 410-2, and intermediary system 160. In one implementation, mobile gateway device 410-1 may correspond to SGW device 140-1, and mobile gateway device 410-2 may correspond to SGW device 140-2. In another implementation, mobile gateway device 410-1 may correspond to PGW device 150-1, and mobile gateway device 410-2 may correspond to PGW device 150-2. User device 110, mobile gateway device 410-1, mobile gateway device 410-2, and intermediary system 160 may include the features described above in connection with, for example, FIGS. 1, 2, and 3A-3D.

As further shown in FIG. 4A, user device 110 may provide, to intermediary system 160, a request 420 to create a session. Assume, for explanatory purposes, that intermediary system 160 receives request 420, and selects mobile gateway device 410-1 for the session, because, for example, mobile gateway device 410-1 is less loaded than mobile gateway device 410-2. Intermediary system 160 may generate three-way tokens 430-1, 430-2, and 430-3 for request 420. Intermediary system 160 may transmit token 430-1 to mobile gateway device 410-1, may transmit token 430-2 to mobile gateway device 410-2, and may store token 430-3. Mobile gateway device 410-1 may use token 430-1 for a session 440 between user device 110 and network 180. Intermediary system 160 may steer traffic between user device 110 and network 180, by using mobile gateway device 410-1, based on stored token 430-3 and token 430-1 of mobile gateway device 410-1 (e.g., by matching token 430-3 to token 430-1).

As further shown in FIG. 4B, mobile gateway device 410-1 may store token 430-1, mobile gateway device 410-2 may store token 430-2, and intermediary system 160 may store token 430-3. Intermediary system 160 may transmit a pilot packet 450. In one implementation, mobile gateway device 410-1 may receive pilot packet 450, and may transmit health information 460 in response thereto. Assume, for example, that intermediary system 160 identifies a failure 470 of mobile gateway device 410-1 based on health information 460. For example, health information 460 may indicate that mobile gateway device 410-1 is inactive. In another implementation, intermediary system 160 may identify failure 470 of mobile gateway device 410-1 when intermediary system 160 does not receive any response to pilot packet 450 after a particular period of time. Failure 470 may occur when mobile gateway device 410-1 is overloaded, when power to mobile gateway device 410-1 is cut, when mobile gateway device 410-1 is taken out of service by an operator of a carrier network associated with mobile gateway device 410-1, etc.

After identifying failure 470 of mobile gateway device 410-1, intermediary system 160 may determine that mobile gateway device 410-1 may no longer be used for session 440. Intermediary system 160 may determine that mobile gateway device 410-2 also stores a token (i.e., 430-2) associated with request 420. Mobile gateway device 410-2 may use token 430-2 for an alternative session 480 between user device 110 and network 180. After determining that mobile gateway device 410-1 has failed, intermediary system 160 may steer traffic between user device 110 and network 180, by using mobile gateway device 410-2, based on stored token 430-3 and token 430-2 of mobile gateway device 410-2 (e.g., by matching token 430-3 to token 430-2).

Although FIGS. 4A and 4B show example component of portion 400, in other implementations, portion 400 may include fewer components, different components, differently arranged components, or additional components than those depicted in FIGS. 4A and 4B. Additionally, or alternatively, one or more components of portion 400 may perform one or more tasks described as being performed by one or more other components of portion 400.

Figure 5:
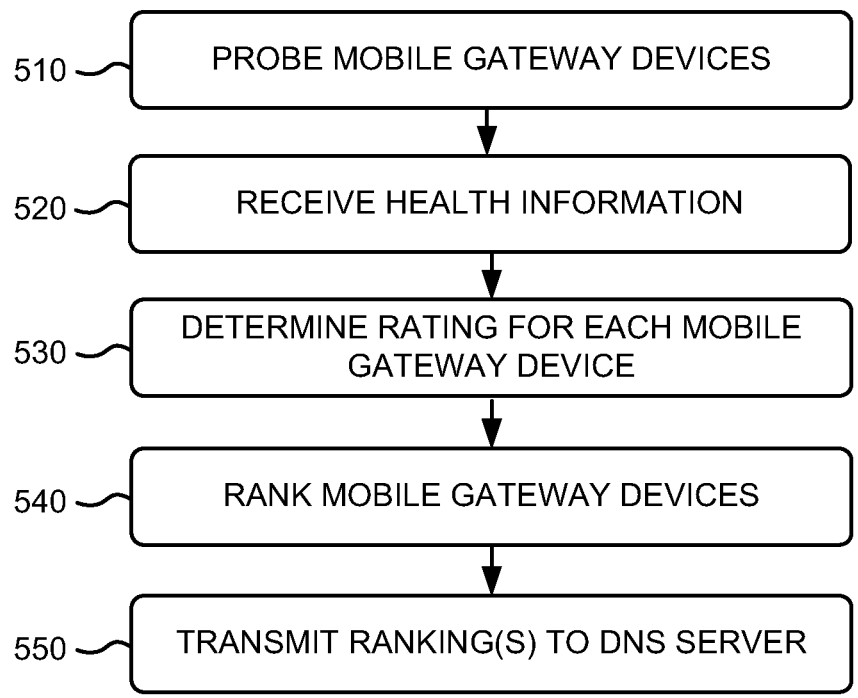
FIG. 5 is a flow chart of an example process for ranking mobile gateways.

FIG. 5 is a flow chart of an example process 500 for ranking mobile gateways. In one implementation, process 500 may be performed by intermediary system 160. Alternatively, or additionally, some or all of process 500 may be performed by another device or group of devices, including or excluding intermediary system 160.

As shown in FIG. 5, process 500 may include probing mobile gateway devices (block 510) and receiving health information (block 520). For example, in an implementation described above in connection with FIG. 3A, intermediary system 160 may probe SGW devices 140 by transmitting pilot packet 310-1 to SGW device 140-1 and pilot packet 310-2 to SGW device 140-2. In response to pilot packets 310, intermediary system 160 may receive health information 320-1 from SGW device 140-1 and health information 320-2 from SGW device 140-2. Furthermore, in an implementation described above in connection with FIG. 3B, intermediary system 160 may probe PGW devices 150 by transmitting pilot packet 312-1 to PGW device 150-1 and pilot packet 312-2 to PGW device 150-2. In response to pilot packets 312, intermediary system 160 may receive health information 322-1 from PGW device 150-1 and health information 322-2 from PGW device 150-2.

Process 500 may further include determining a rating for each one of the mobile gateway devices (block 530). For example, in an implementation described above in connection with FIGS. 3A and 3B, intermediary system 160 may determine a first SGW rating for SGW device 140-1 based on health information 320-1, a second SGW rating for SGW device 140-2 based on health information 320-1, a first PGW rating for PGW device 150-1 based on health information 322-1, and/or a second PGW rating for PGW device 150-2 based on health information 322-2. For example, assume health information 320-1 includes load information and temperature information. Intermediary system 160 may assign a first value to the load information (e.g., a lower value to lower loads and a higher value to higher loads), and may assign a second value to the temperature information (e.g., an ideal temperature is assigned a particular value and the farther away the ideal temperature. the higher the value that is assigned). Intermediary system 160 may calculate the first SGW rating based on the first value and the second value. In one example, the first SGW rating may equal a sum of the first value and the second value. In another example, the first SGW rating may equal an average of the first value and the second value. In yet another example, the first SGW rating may equal a sum of the first value multiplied by a first weight (e.g., 1) and the second value multiplied by a second weight (e.g., 0.5). Intermediary system 160 may calculate the second SGW rating in a similar manner. Intermediary system 160 may calculate the first PGW rating and the second PGW rating by using the same process that is used to calculate the first SGW rating and the second SGW rating or by using a different process.

Process 500 may also include ranking the mobile gateway devices (block 540) and transmitting one or more ranking(s) to a DNS (block 550). Thereafter, intermediary system 160 may generate ranking 330 of SGW devices 140 based on the first SGW rating and the second SGW rating, and may generate ranking 332 of PGW devices 150 based on the first PGW rating and the second PGW rating. Intermediary system 160 may transmit ranking 330 of SGW devices 140 and/or ranking 332 of PGW devices 150 to DNS 170.

Intermediary system 160 may repeat process 500 at a particular interval (e.g., ever 1 hour). Accordingly, DNS 170 may store rankings (i.e., ranking 330 and ranking 332) that are current (e.g., up to date).

Figure 6:
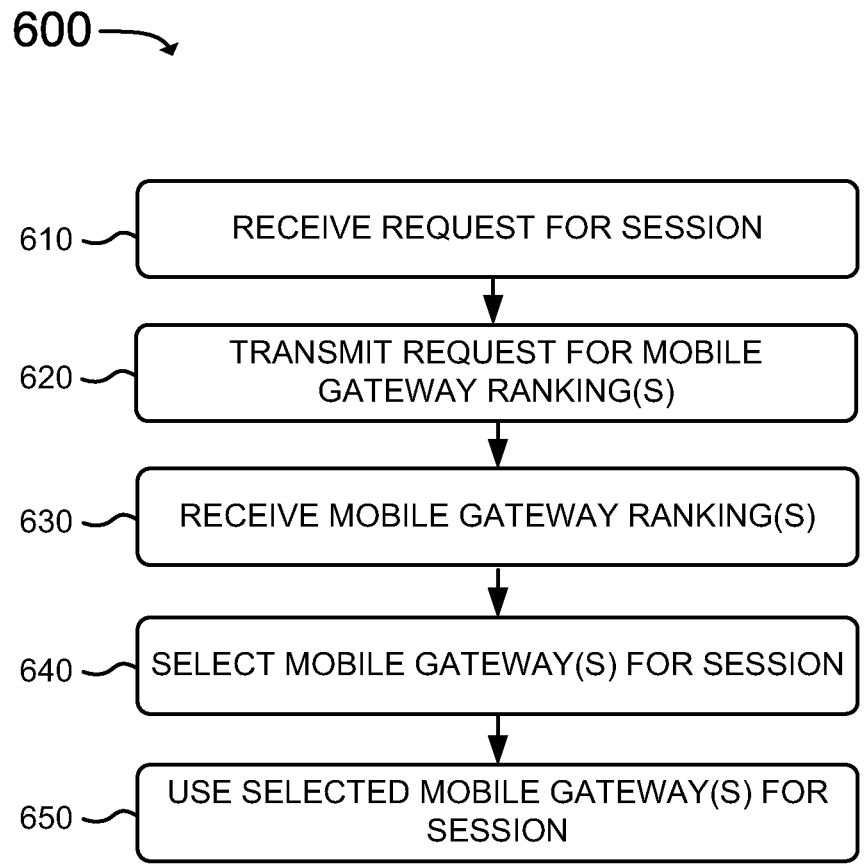
FIG. 6 is a flow chart of an example process for selecting mobile gateways based on rankings of mobile gateways.

FIG. 6 is a flow chart of an example process 600 for selecting mobile gateways based on rankings of mobile gateways. In one implementation, process 600 may be performed by intermediary system 160. Alternatively, or additionally, some or all of process 600 may be performed by another device or group of devices, including or excluding intermediary system 160. For example, MME device 130 may perform process 600.

As shown in FIG. 6, process 600 may include receiving a request for a session (block 610). For example, in an implementation described above in connection with FIG. 3C, a user of user device 110 may request a service that is provided via network 180. User device 110 may generate request 340 to create a session for the service. User device 110 may transmit request 340 to base station 120, base station 120 may transmit request 340 to MME device 130, and MME device 130 may transmit request 340 to intermediary system 160. Intermediary system 160 may receive request 340.

Process 600 may further include transmitting a request for one or more mobile gateway rankings (block 620) and receiving the one or more mobile gateway rankings (block 630). For example, in an implementation described above in connection with FIG. 3C, in response to request 340, intermediary system 160 may transmit request for mobile gateway rankings 350 to DNS 170. In response, intermediary system 160 may receive mobile gateway rankings 360 from DNS 170. Mobile gateway rankings 360 may include ranking 330 of SGW devices 140 (FIG. 3A) and ranking 332 of PGW devices 150 (FIG. 3B).

Process 600 may also include selecting one or more mobile gateways for the session (block 640) and using the one or more selected mobile gateways for the session (block 650). For example, in an implementation described above in connection with FIG. 3D, intermediary system 160 may select to use a particular SGW device 140 (e.g., SGW device 140-1) based on ranking 330. Additionally, or alternatively, intermediary system 160 may select to use a particular PGW device 150 (e.g., PGW device 150-2) based on ranking 332. In one example implementation, ranking 330 may indicate that SGW device 140-1 has a rating that is higher than a rating of any other SGW device 140 included in ranking 330. The higher rating may indicate that a load of SGW device 140-1 is less than a load of any other SGW device 140 included in ranking 330. Ranking 332 may indicate that PGW device 150-2 has a rating that is higher than a rating of any other PGW device 150 included in ranking 332. The higher rating, of PGW device 150-2, may indicate that a load of PGW device 150-2 is less than a load of any other PGW device 150 included in ranking 332. Intermediary system 160 may use SGW device 140-1 and PGW device 150-2 to create session 370 between user device 110 and network 180. User device 110 may connect to network 180 via session 370, and may receive requested resource 380 (i.e., the service requested by the user) via session 370.

Figure 7:
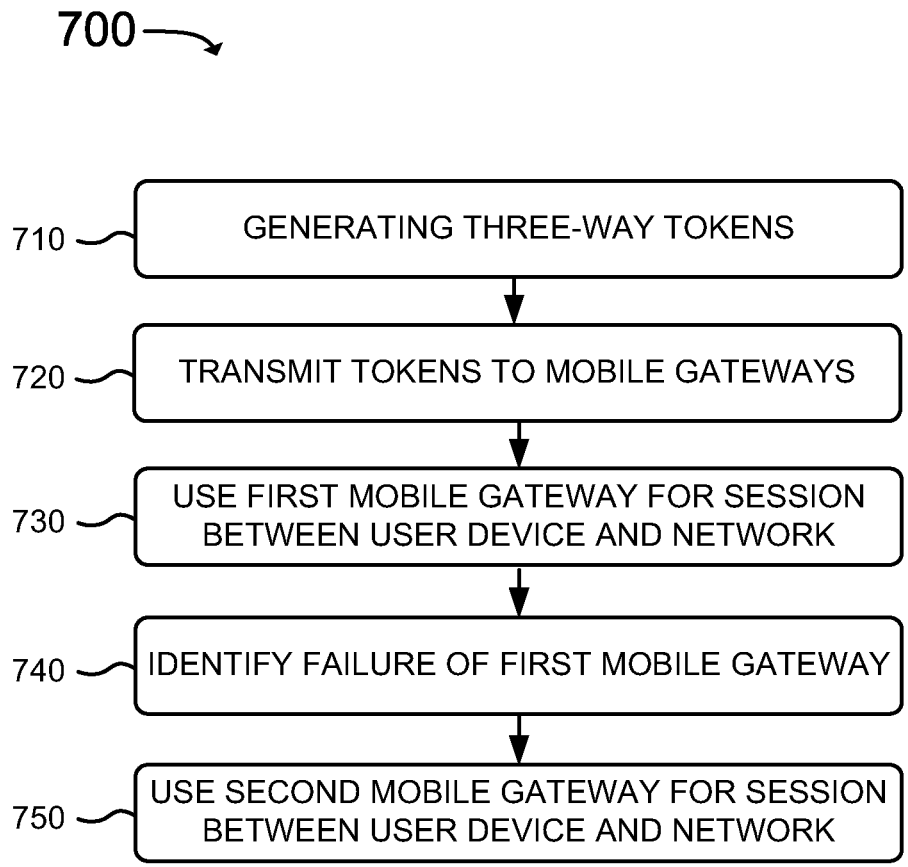
FIG. 7 is a flow chart of an example process for switching a user device from one mobile gateway to another mobile gateway.

FIG. 7 is a flow chart of an example process 700 for switching user device 110 from one mobile gateway to another mobile gateway. In one implementation, process 700 may be performed by intermediary system 160. Alternatively, or additionally, some or all of process 700 may be performed by another device or group of devices, including or excluding intermediary system 160.

As shown in FIG. 7, process 700 may include generating three-way tokens (block 710) and transmitting the tokens to mobile gateways (block 720). For example, in an implementation described above in connection with FIG. 4A, intermediary system 160 may create three-way tokens 430-1, 430-2, and 430-3 to service request 420 (e.g., a request to create a connection between user device 110 and network 180) received from user device 110. In one implementation, three-way tokens 430-1, 430-2, and 430-may be three portions of a single token. Each one of three-way tokens 430-1, 430-2, and 430 may include a different sequence of numbers. Intermediary system 160 may match three-way tokens 430-1, 430-2, and 430 based on an original sequence of the single token and/or based on an identifier, associated with request 420, that is included in/with each one three-way tokens 430-1, 430-2, and 430. Intermediary system 160 may transmit token 430-1 to mobile gateway device 410-1, may transmit token 430-2 to mobile gateway device 410-2, and may store token 430-3.

Process 700 may further include using a first mobile gateway for a session between the user device and the network (block 730). For example, in an implementation described above in connection with FIG. 4A, intermediary system 160 may initially select to use mobile gateway device 410-1 for session 440 between user device 110 and network 180. Mobile gateway device 410-1 may use token 430-1 for session 440 between user device 110 and network 180. Intermediary system 160 may steer traffic, for session 440, between user device 110 and network 180, for example, by matching stored token 430-3 to token 430-1 of mobile gateway device 410-1, as described above.

Process 700 may also include identifying a failure of the first mobile gateway (block 740) and using a second mobile gateway for a session between user device 110 and network 180 (block 750). For example, in an implementation described above in connection with FIG. 4B, intermediary system 160 may identify failure 470 of mobile gateway device 410-1 when mobile gateway device 410-1, for example, becomes inactive. In response to identifying failure 470, intermediary system 160 may determine that token 430-2 is the other token that matches token 430-3, and that mobile gateway device 410-2 may use token 430-2 for alternative session 480 between user device 110 and network 180. Accordingly, intermediary system 160 may use mobile gateway device 410-2 to steer traffic, for alternate session 480, between user device 110 and network 180, for example, by matching stored token 430-3 to token 430-2 of mobile gateway device 410-2, as described above.

Systems and/or methods described herein may balance loads of mobile gateways, such as SGW devices 140 and/or PGW devices 150. Additionally, or alternatively, the systems and/or methods described herein may use an alternate mobile gateway, when another mobile gateway fails, for a session between user device 110 and network 180 without requiring user device 110 to reestablish a connection.

The foregoing description of implementations provides illustration and description, but is not intended to be exhaustive or to limit the invention to the precise form disclosed. Modifications and variations are possible in light of the above teachings or may be acquired from practice of the invention.

Furthermore, while series of blocks have been described with regard to FIGS. 5-7, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
   receiving, by a device, first information from a first mobile gateway;
   receiving, by the device, second information from a second mobile gateway;
   ranking, by the device, the first mobile gateway and the second mobile gateway based on the first information and the second information;
   transmitting, by the device, the ranking to a server;
   receiving, by the device, a request for a session from a user device;
   transmitting, by the device, a rank request to the server after receiving the request for the session;
   receiving, by the device, the ranking from the server in response to the rank request;
   selecting, by the device, the first mobile gateway or the second mobile gateway based on the ranking; and
   using, by the device, the selected mobile gateway for the session.

2. The method of claim 1, where the first mobile gateway and the second mobile gateway are service gateways (SGWs) or packet data network (PDN) gateways (PGWs).

3. The method of claim 1, where the first information comprises at least two of:
- information that indicates whether the first mobile gateway is active,
- load information associated with the first mobile gateway, or
- a first temperature of the first mobile gateway, wherein the first temperature is associated with determining whether the first mobile gateway is more or less likely to fail, than other mobile gateways.

4. The method of claim 1, where receiving the first information comprises:
- transmitting a packet to the first mobile gateway, and
- receiving the first information from the first mobile gateway in response to the packet.

5. The method of claim 1,
where ranking comprises:
- determining a first rating of the first mobile gateway based on the first information,
- determining a second rating of the second mobile gateway based on the second information, and
- ranking the first mobile gateway and the second mobile gateway based on the first rating and the second rating,
where the ranking indicates whether to use the first mobile gateway or the second mobile gateway for a new session.

6. The method of claim 1, further comprising:
- receiving third information from a third mobile gateway;
- receiving fourth information from a fourth mobile gateway, where a first type of the first mobile gateway and the second mobile gateway is different from a second type of the third mobile gateway and the fourth mobile gateway;
- ranking the third mobile gateway and the fourth mobile gateway based on the third information and the fourth information; and
- selecting the third mobile gateway or the fourth mobile gateway based on the ranking of the third mobile gateway and the fourth mobile gateway,
where using the selected mobile gateway for the session comprises:
- using one of the first mobile gateway or the second mobile gateway and one of the third mobile gateway or the fourth mobile gateway.

7. A device, comprising:
a processor configured to:
- receive first information from a first service gateway (SGW),
- receive second information from a second SGW,
- rank the first SGW and the second SGW based on the first information and the second information,
- transmit the ranking to a server,
- receive a request for a session for a user device,
- transmit, in response to the request, a request for the ranking to the server,
- receive the ranking from the server in response to the request for the ranking,
- select the first SGW or the second SGW based on the ranking, and
- use the selected SGW for the session.

8. The device of claim 7, where the processor is further configured to:
- receive third information from a first packet data network (PDN) gateway (PGW),
- receive fourth information from a second PGW,
- rank the first PGW and the second PGW based on the third information and the fourth information,
- select the first PGW or the second PGW based on the ranking of the first PGW and the second PGW, and
- use the selected PGW for the session.

9. The device of claim 7, where the first information comprises one or more of:
- information that indicates whether the first SGW is active,
- a percentage that indicates a load of the first SGW, or
- a first temperature of the first SGW.

10. The device of claim 7, where the selected SGW is the first SGW when the ranking indicates that a first load of the first SGW is less than a second load of the second SGW.

11. The device of claim 7,
where the selected SGW is the first SGW,
where, when using the selected SGW to create the session comprises, the processor is configured to:
- generate a first token, a second token, and a third token that are associated with one another,
- transmit the first token to the first SGW for the session,
- transmit the second token to the second SGW for an alternative session,
- store the third token, and
- use the first SGW for the session to transmit traffic between the user device and a network by matching the first token to the third token.

12. The device of claim 11, where the processor is further configured to:
- identify a failure of the first SGW, and
- use, after identifying the failure of the first SGW, the second SGW to transmit traffic between the user device and the network by matching the second token to the third token.

13. One or more non-transitory computer-readable media for storing instructions, the instructions comprising:
one or more instructions, which when executed by one or more processors of a device, cause the one or more processors to:
- receive a request to connect a user device to a network;
- generate, in response to the request, a first token, a second token, and a third token for the request, where the third token is associated with the first token and the second token;
- transmit the first token to a first mobile gateway for a first session for the request;
- transmit the second token to a second mobile gateway for a second session for the request;
- store the third token;
- use, based on the first token and the third token, the first mobile gateway to transmit traffic between the user device and the network via the first session;
- identify a failure of the first mobile gateway; and
- use, based on the second token and the third token, the second mobile gateway to transmit the traffic between the user device and the network via the second session.

14. The media of claim 13, where the first mobile gateway and the second mobile gateway are service gateways (SGWs) or packet data network (PDN) gateways (PGWs).

15. The media of claim 13,
where, when using the first mobile gateway to transmit the traffic the instructions cause the one or more processors to:
- transmit, to a server, a request for a rank of mobile gateways,
- receive, from the server, the rank of the mobile gateways, and
- select, based on the rank, to use the first mobile gateway, where the rank indicates that the first mobile gateway is ranked higher than the second mobile gateway.

16. The media of claim 15, wherein the rank further indicates that a first load of the mobile gateway is less than a second load of the second mobile gateway.

17. The media of claim 15, where the instructions further cause the one or more processor to:
- receive first information from the first mobile gateway,
- receive second information from the second mobile gateway,
- generate the rank based on the first information and the second information, and
- transmit the rank to the server.

18. The media of claim 13, where the one or more instructions to identify the failure of the first mobile gateway, cause the one or more processors to:
- transmit a packet to the first mobile gateway,
- receive, in response to the packet and from the first mobile gateway, health information associated with the first mobile gateway, and
- identify the failure based on the health information.

* * * * *